No. 623,144. Patented Apr. 18, 1899.
G. W. DUNSWORTH.
COMBINED BICYCLE AND CARRIER.
(Application filed June 28, 1897.)
(No Model.)
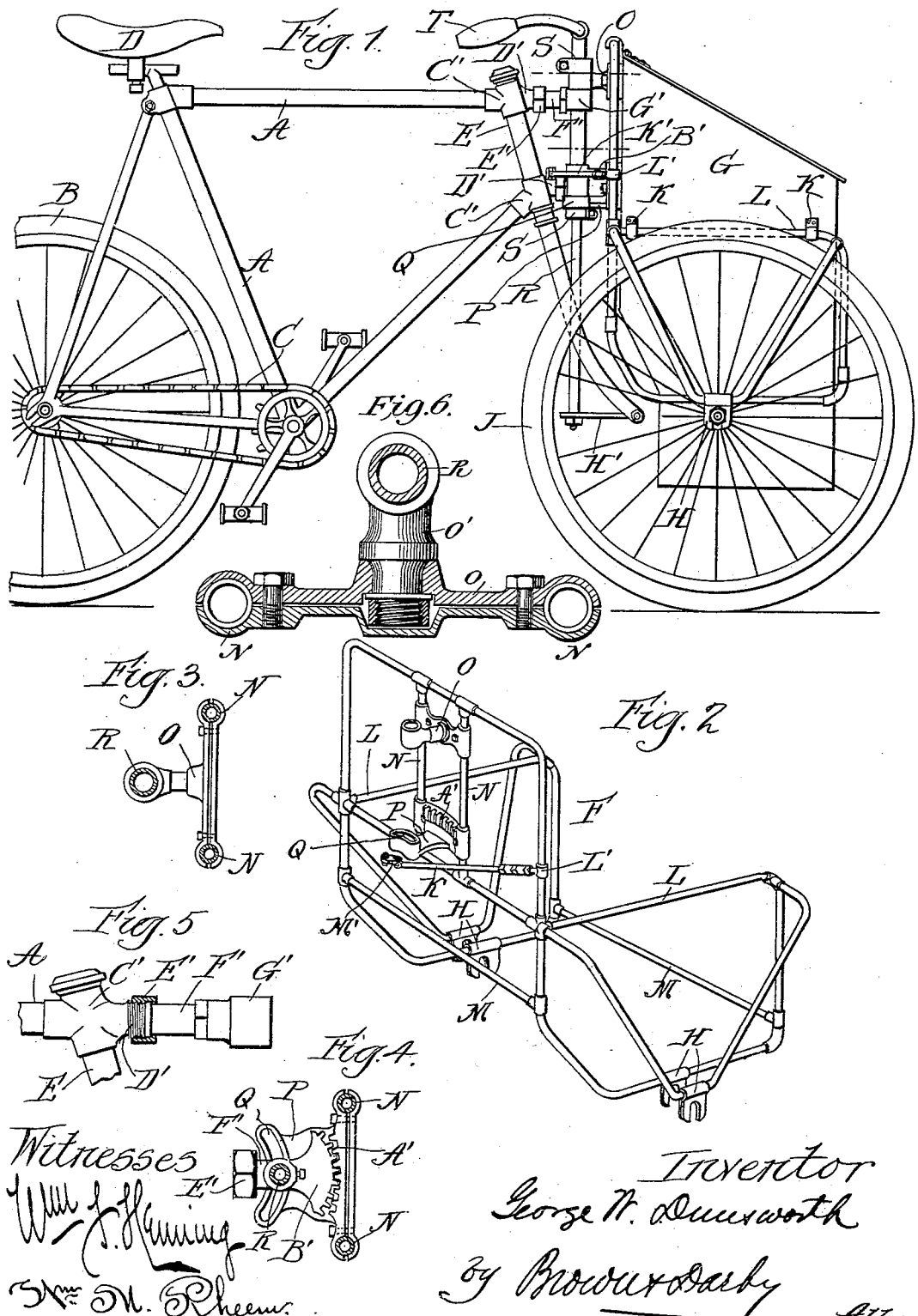

UNITED STATES PATENT OFFICE.

GEORGE W. DUNSWORTH, OF CHICAGO, ILLINOIS.

COMBINED BICYCLE AND CARRIER.

SPECIFICATION forming part of Letters Patent No. 623,144, dated April 18, 1899.

Application filed June 28, 1897. Serial No. 642,577. (No model.)

*To all whom it may concern:*

Be it known that I, GEORGE W. DUNSWORTH, a citizen of the United States, residing at Chicago, in the county of Cook and State of Illinois, have invented a new and useful Combined Bicycle and Carrier, of which the following is a specification.

This invention relates to a combined bicycle and carrier.

The object of the invention is to provide a construction wherein an ordinary bicycle may be converted into a luggage or parcel carrier or the like by the removal of the front wheel and the substitution therefor of a carrier suitable for the purposes desired.

Other objects of the invention will more fully appear hereinafter.

Referring to the accompanying drawings and to the various views and reference-signs appearing thereon, Figure 1 is a view in side elevation of a bicycle with the front wheel thereof removed and the carrier attachment applied in place thereof, a portion of the rear wheel being broken away. Fig. 2 is a detail view in perspective of the carrier-frame attachment detached. Fig. 3 is a detail sectional view on the line 3 3, Fig. 1. Fig. 4 is a similar view on the line 4 4, Fig. 1. Fig. 5 is a broken detail view showing the coupling-sleeve for securing the guiding-bar of the carrier attachment to the bicycle-frame. Fig. 6 is a detail view in section, showing the manner of mounting the steering-rod for relative lateral movement with respect to the carrier-frame.

The same part is designated by the same reference-sign wherever it occurs throughout the several views.

In the drawings, reference-sign A designates the frame of a bicycle; B, the rear wheel thereof; C, the driving-gear; D, the seat; E, the front fork. These parts may be of the usual or any ordinary well-known or convenient construction or type and require no special description.

G designates the carrier, which may comprise a receptacle adapted to receive the parcels or packages, or, as is obvious, it may comprise a seat for carrying persons, an invalid's chair, or the like, and which I will herein refer to generically as the "carrier." The framework for supporting the carrier may be of any suitable form, construction, or arrangement. In the particular form shown, to which, however, I do not desire to be limited or restricted, this frame is made of tubular sections suitably joined. On each side the frame, which I will refer to generally by reference-sign F, is provided with lugs H, adapted to receive the axles of wheels J in the usual way in which the axles of bicycle-wheels are received in the bicycle-frames, whereby the carrier-frame is supported. The carrier, whether a box, basket, seat, or the like, is supported upon the frame in any suitable or convenient manner—as, for instance, by means of hangers K, adapted to rest over the side bars L of the frame. The cross-bars M serve to give strength and rigidity to the frame. The frame F is provided with two vertical rods N. At or near the top of said rods N is clamped a casting O, in which is swiveled a casting O', having a sleeve, and at or near the lower ends of said rods is suitably clamped a second casting P, having an elongated curved slot or opening Q therethrough, said opening being in vertical alinement with the sleeve carried by casting O'. A steering-rod R is mounted in said sleeve to rotate axially therein and is arranged to extend loosely through said elongated slot Q, said rod being held in suitable vertical adjustment by means of collars S in the usual manner, and a handle-bar T is adapted and arranged to be mounted at the upper end thereof. For the sake of convenience the steering-rod R is so constructed as to be capable of receiving the handle-bar from the front fork E of the bicycle-frame A, thereby avoiding the necessity of new or additional parts in effecting the change from a bicycle to a parcel-carrier or the reverse. The casting P is provided with segmentally-arranged rack-teeth A', and mounted upon steering-rod R to rotate or move therewith when said rod is axially rotated under the influence of the handle-bar is a guide consisting of a collar forming a bearing for rod R and itself capable of moving laterally in curved slot Q. Integral with said collar on one side is an arm terminating in an exterior flange and surrounding coupling nut or cap E' for the purpose of fastening it rigidly to the lower fitting C' of the steering-head D', and on the other side is a segment-plate B', having teeth arranged to interlock with the teeth of segment A'. From this construction it will be seen that when the steering-rod R is rotated under the influence of the handle-bar the entire carrier-frame is positively swung in a direction following that of the handle-bar, the swivel mounting of casting O' and the curved slot Q permitting relative lateral movement of said rod R and the carrier-frame.

I will now describe the means for attaching or coupling the carrier to the bicycle-frame. The fittings C' of the bicycle-frame, through which the front fork E operates, are provided with short threaded extensions or projections D', adapted to receive a threaded cap or nut E', suitably mounted on or swively secured to a short rod or bar F', carrying a sleeve G', through which the steering-rod R is adapted and arranged to pass. Thus it will be seen that by screwing or unscrewing the nuts or caps E' from the threaded projections or extensions D' and the nut holding the hereinafter-described plate H' the entire carrier may be readily and easily attached to or detached from the bicycle-frame. When the carrier is not used, suitable ornamental caps may be arranged to screw on the threaded projections or extensions D', thereby concealing the same and adding an ornamental finish to the machine when used as a bicycle. The lower end of steering-bar R carries a plate H', which is arranged to be attached or secured in any convenient manner to the lower ends of the front fork E in order to hold the same from free movement and also as an additional support for the steering-rod.

Of course it will be evident that the front fork may be turned rearwardly, if desired, instead of forwardly when the machine is used with the carrier attachment. Thus where the carrier comprises a square box, basket, seat, or the like it is necessary to turn the front fork E rearwardly in order to accommodate the square outline thereof; but the particular position occupied by the front fork E when the carrier attachment is in use is wholly immaterial, as it performs no specially important function, except, as above indicated, it is desirable to hold the front fork against free movement, and the connection H' performs this duty, while at the same time affording an additional support for the steering-rod.

From the foregoing description it will be seen that I provide an exceedingly simple and efficient construction whereby a bicycle may be converted into a carrier speedily and readily by merely removing the front wheel of the bicycle and screwing the nuts E' of the carrier to the threaded projections D' and attaching the bottom plate H' to the front fork E and removing the handle-bar from the fork E and placing it upon the steering-rod R.

The provision of the elongated curved slot Q in casting P and through which steering-rod R passes is an important feature, as is also the feature of swively mounting the casting O', for thereby a movement of said casting, and hence of the carrier-frame, relative to the steering-rod and laterally with respect thereto is thereby permitted. This is important in turning the machine at corners and the like, where it is essential to permit the bicycle-frame to tilt sidewise in the direction in which the turn is to be made. If the connection between the steering-rod and casting P were rigid or did not permit of such relative movement, then the frame A of the bicycle could not tilt in making turns or turning corners, and hence the danger would be incurred of tipping the entire machine over in the opposite direction to that in which the turn is being made, and the greater the speed at which the machine is being urged by the rider the greater the danger in this regard. In order to still further insure the proper relative movement of the casting and the steering-rod and to properly guide and hold the carrier-frame in turning, I provide a guide-rod K', pivotally connected at L' to the carrier-frame at one end and at the other end, M', thereof pivotally connected to the projection or extension D' of the lower fitting C' of the bicycle-frame in proximity to the center of curvature of slot Q.

By supporting the carrier G of the attachment by the lugs or hangers K, resting upon the side bars L of the frame, said receptacle or carrier can be readily removed and replaced by any other suitable form of receptacle or carrier support—as, for instance, a seat or an invalid's chair or the like. It will also be seen that I provide an exceedingly simple, strong, durable, and efficient bundle-carrier attachment for bicycles; that the ordinary bicycle-frame may be readily, easily, and speedily connected or coupled up to the carrier-frame; that the carrier attachment is always in front of the rider, thereby enabling him to steer the machine with greater facility and less danger than if the carrier attachment was at the rear, and that the power required in propelling the apparatus is more effectively applied from the rear of the carrier than from in front, since it is pushed rather than pulled. This results not only in a more effective application of the power, but it leaves the carrier under better and more complete control of the rider.

Having now set forth the object and nature of my invention and a form of apparatus embodying the same and having explained the construction, function, and mode of operation thereof, what I claim as new and useful and of my own invention, and desire to secure by Letters Patent of the United States, is—

1. In an interconvertible bicycle and carrier, a bicycle-frame having a removable front wheel, bearings detachably connected to the front bar of said frame, a steering-rod arranged to be journaled in said bearings, and a carrier attachment adapted to be connected to said rod, when said front wheel is removed, as and for the purpose set forth.

2. In an interconvertible bicycle and carrier, a bicycle-frame having the usual front fork and a removable front wheel journaled therein, bearings detachably connected to the front bar of said frame, a steering-rod journaled in said bearings, a carrier attachment arranged to be connected to said steering-rod, when said front wheel is removed, and a connection between said front fork and said steering-rod, as and for the purpose set forth.

3. In an interconvertible bicycle and carrier, a bicycle-frame, having the usual removable front wheel, in combination with a carrier-frame, wheels mounted therein for supporting the same, said frame having side bars, a carrier having lugs or hangers, arranged to be received on said side bars, whereby said carrier is supported upon said carrier-frame, and means for detachably securing said carrier-frame to the bicycle-frame in place of the front wheel thereof, as and for the purpose set forth.

4. In an interconvertible bicycle and carrier, a bicycle-frame having a removable front wheel, bearings detachably connected to the front bar of said frame, a steering-rod journaled in said bearings, and a carrier attachment adapted to be connected to said steering-rod when said front wheel is removed, said connections being constructed to permit of slight lateral movement of said attachment relative to said steering-rod, as and for the purpose set forth.

5. In an interconvertible bicycle and carrier, a bicycle-frame having a removable front wheel, bearings carried by said frame, a steering-rod journaled in said bearings, a carrier attachment interchangeable with said front wheel, a swivel connection between said carrier attachment and the upper end of said rod, and a slotted connection between said carrier attachment and rod, said slotted connection arranged below said swivel connection, as and for the purpose set forth.

6. In an interconvertible bicycle and carrier, a bicycle-frame having a removable front wheel, threaded extensions projecting from the front bar of said frame, sleeves having screw-couplings adapted to be screwed into said extensions, a steering-rod journaled in said sleeves, a carrier-frame interchangeable with said front wheel, and means for connecting said steering-rod to said carrier-frame, as and for the purpose set forth.

7. In an interconvertible bicycle and carrier, a bicycle-frame, a steering-rod detachably journaled therein, a carrier-frame, a swivel connection between said carrier-frame and the upper end of said rod, a rack mounted on said carrier-frame, and a segment-gear carried by said rod and arranged to engage said rack, and connections between said carrier-frame and steering-rod for maintaining said gear and rack in mesh with each other, as and for the purpose set forth.

8. In an interconvertible bicycle and carrier, a bicycle-frame, a steering-rod detachably journaled therein, a carrier-frame, a rack-plate having a slotted extension, said rod arranged to pass through the slot in said extension, and a segment-gear carried by said rod and arranged to mesh with said rack, as and for the purpose set forth.

9. In an interconvertible bicycle and carrier, a bicycle-frame, a steering-rod journaled therein, a carrier-frame interchangeable with the front wheel of the bicycle, swivel connections between said carrier-frame and the upper end of said rod, a rack mounted on said carrier, a plate projecting from said carrier-frame and provided with a curved slot, said rod arranged to pass through said slot, and a segment-gear mounted on said rod and arranged to mesh with said rack, as and for the purpose set forth.

10. In an interconvertible bicycle and carrier, a bicycle-frame, a steering-rod detachably journaled therein, a carrier-frame interchangeable with the front wheel of the bicycle, a casting having gear-teeth and mounted on said carrier-frame, said casting provided with a slotted extension through which said steering-rod passes, a segment-gear carried by said rod and arranged to engage said rack, and a guide-rod pivotally connecting said carrier and bicycle frames, as and for the purpose set forth.

In witness whereof I have hereunto set my hand, this 4th day of June, 1897, in the presence of the subscribing witnesses.

GEORGE W. DUNSWORTH.

Attest:
  H. H. HUMPHREY,
  S. E. DARBY.